US006807351B2

(12) United States Patent
Hebgen et al.

(10) Patent No.: US 6,807,351 B2
(45) Date of Patent: Oct. 19, 2004

(54) L-BAND DISPERSION COMPENSATING FIBER AND TRANSMISSION SYSTEM INCLUDING SAME

(75) Inventors: Peter G. Hebgen, Horseheads, NY (US); Gang Qi, Painted Post, NY (US); Lu Zhang, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 40 days.

(21) Appl. No.: 10/238,100

(22) Filed: Sep. 9, 2002

(65) Prior Publication Data

US 2003/0063881 A1 Apr. 3, 2003

Related U.S. Application Data

(63) Continuation-in-part of application No. 09/965,406, filed on Sep. 26, 2001.

(51) Int. Cl.[7] .......................... G02B 06/22; G02B 06/02
(52) U.S. Cl. ....................................... 385/127; 385/128
(58) Field of Search ................................ 385/123–124, 385/126–128, 141–145

(56) References Cited

U.S. PATENT DOCUMENTS

| 4,715,679 | A | 12/1987 | Bhagavatula | 350/96.33 |
|---|---|---|---|---|
| 5,361,319 | A | 11/1994 | Antos et al. | 385/123 |
| 5,448,674 | A | 9/1995 | Vengsarkar et al. | 385/123 |
| 5,673,354 | A | 9/1997 | Akasaka et al. | 385/127 |
| 5,740,297 | A | 4/1998 | Onishi et al. | 385/127 |
| 5,742,723 | A | 4/1998 | Onishi et al. | 385/127 |
| 5,838,867 | A | 11/1998 | Onishi et al. | 385/123 |
| 5,995,695 | A | 11/1999 | Aikawa et al. | 385/123 |
| 5,999,679 | A | 12/1999 | Antos et al. | 385/127 |
| 6,009,221 | A | 12/1999 | Tsuda | 385/123 |

(List continued on next page.)

FOREIGN PATENT DOCUMENTS

| EP | 1081514 A1 | 3/2001 | |
|---|---|---|---|
| EP | 1 107 028 A1 | 6/2001 | ............ G02B/6/22 |
| EP | 1130428 A1 | 9/2001 | |
| EP | 1202479 A1 | 5/2002 | |
| JP | 2001-311849 | 11/2001 | ............ G02B/6/22 |
| WO | WO 99/08142 | 2/1999 | ............ G02B/6/22 |
| WO | WO 00/67053 | 11/2000 | ............ G02B/6/16 |
| WO | WO 01/71391 A2 | 9/2001 | |

OTHER PUBLICATIONS

U.S. patent application Ser. No. 60/271,754, Nolan et al., filed Feb. 26, 2001.
U.S. patent application Ser. No. 60/304,662, Zhang, filed Jul. 11, 2001.
U.S. patent application Ser. No. 09/802,696, Jiang et al., filed Mar. 9, 2001.
"TrueWave®. RS Nonzero–Dispersion Optical Fiber *Optimized for the Third and Ready for the Fourth Wavelength Window*!" Lucent Technologies, Bell Labs Innovations.
"Dispersion Compensating Fibers" Lars Gruner–Nielsen, et al Optical Fibers Technology 6, 164–180 XP–001025104.

*Primary Examiner*—Edward J. Glick
*Assistant Examiner*—Krystyna Suchecki
(74) *Attorney, Agent, or Firm*—Randall S. Wayland

(57) ABSTRACT

The present invention relates to a dispersion compensating optical fiber ("DC fiber") having a segmented core of at least three segments and having a negative total dispersion and negative dispersion slope in the L-band. The index profile of the segmented core is selected to provide an optical fiber having properties suitable for a high performance communication system operating in the L-band wavelength band, i.e., between about 1570 nm to 1620 nm. The DC fiber according to the invention exhibits total dispersion at 1595 nm of between –70 and –225 ps/km/nm and dispersion slope more negative than –0.7 ps/km/nm$^2$. The DC fiber may be optically connected to a non-zero dispersion shifted fiber in the system to compensate for dispersion and dispersion slope thereof.

39 Claims, 10 Drawing Sheets

U.S. PATENT DOCUMENTS

| | | | |
|---|---|---|---|
| 6,031,955 A | 2/2000 | Mukasa et al. | 385/123 |
| 6,178,279 B1 | 1/2001 | Mukasa et al. | 385/123 |
| 6,229,935 B1 | 5/2001 | Jones et al. | 385/24 |
| 6,263,138 B1 | 7/2001 | Sillard et al. | 385/123 |
| 6,400,877 B1 | 6/2002 | Kato et al. | 385/123 |
| 6,477,306 B2 * | 11/2002 | Kato et al. | 385/123 |
| 6,490,398 B2 * | 12/2002 | Gruner-Nielsen et al. | 385/123 |
| 6,493,494 B1 | 12/2002 | Rousseau et al. | 385/123 |
| 6,501,892 B1 * | 12/2002 | Okuno et al. | 385/127 |
| 6,546,178 B2 * | 12/2002 | Okuno et al. | 385/127 |
| 2002/0012510 A1 | 1/2002 | Jiang et al. | 385/123 |
| 2002/0102085 A1 | 8/2002 | Arai et al. | 385/127 |

\* cited by examiner

L-BAND DISPERSION COMPENSATING FIBER AND TRANSMISSION SYSTEM INCLUDING SAME

This application is a continuation-in-part of U.S. patent application Ser. No. 09/965,406 filed Sep. 26, 2001.

FIELD OF THE INVENTION

The invention is directed to a dispersion compensating optical fiber and a transmission system including the same, and more particularly to a dispersion compensating optical fiber and transmission system in which the dispersion compensating fiber exhibits a negative dispersion and dispersion slope within the L-band (1570 nm to 1620 nm).

BACKGROUND OF THE INVENTION

Higher data rates are becoming needed for the telecommunications industry. Thus, the search for high performance optical fibers designed for long distance, high bit rate telecommunications has intensified. However, these high data rates have penalties associated with them. In particular, dispersion is a significant problem for such systems, particularly those employing large effective area fibers. More specifically, positive dispersion builds as a function of the length of the high data rate transmission fiber. Dispersion Compensating (DC) fibers included in cable or in Dispersion Compensating Modules (DCM's) have been designed that compensate for such dispersion. These fibers generally have negative slope and negative dispersion such that a short length of the DC fiber compensates for the positive dispersion and positive slope of the longer transmission portion. A good example of a DC fiber may be found in commonly assigned U.S. patent application Ser. No. 09/802,696 filed on Mar. 9, 2001. For L-band operation between 1570 nm and 1620 nm, the bend performance and dispersion properties (dispersion and/or dispersion slope) of the DC fiber are very important. This is particularly true in DC fibers that will be included in a wound spool of a DCM.

Thus, there is a need for a DC fiber which: (1) is single moded over the L-band wavelength range (1570 nm to 1620 nm) when included in a DCM; and (2) retains the usual high performance optical fiber characteristics such as high strength, low attenuation and acceptable resistance to bend induced loss, and (3) is particularly effective at compensating for the dispersion of Non-Zero Dispersion Shifted Fibers (NZDSF) in the L-band.

Definitions

The following definitions are in accordance with common usage in the art.

The refractive index profile is the relationship between refractive index and optical fiber radius.

A segmented core is one that has at least a first and a second segment such as a central core and a moat, for example. Each core segment has a respective refractive index profile and maximum and minimum index.

The radii of the segments of the core are defined in terms of the beginning and end points of the segments of the refractive index profile or in terms of the midpoint of the segment in the case of a ring segment. FIG. 2 illustrates the definitions of radii used herein. The same definitions are used for FIGS. 3–5. The radius $R_1$ of the center core segment 22, is the length that extends from the DC fiber's centerline (CL) to the point at which the profile crosses the relative refractive index zero as measured relative to the cladding 30. The outer radius $R_2$ of the moat segment 24 extends from the centerline to the radius point at which the outer edge of the moat crosses the refractive index zero, as measured relative to the cladding 30. The radius $R_3$ is measured to where $\Delta_3$ % is half its maximum value of the ring segment 26. The half-height width of ring segment 26 is measured at the half $\Delta$ % value of ring segment 26. The radius $R_3$ of segment 26 extends from the centerline (CL) to the midpoint 28 of a half-height line segment 27. The midpoint 28 is formed by bisecting the segment 26 between the two intersection points with the ring segment at the half height position of $\Delta_3$ %. The radius $R_4$ is measured from the centerline (CL) to the point where the outermost portion of the ring segment 26 meets the zero refractive index point, as measured relative to the cladding 30.

The effective area is defined as:

$A_{eff}=2\pi (\int E^2 r\, dr)^2/(\int E^4 r\, dr)$, where the integration limits are 0 to $\infty$, and E is the electric field associated with the propagated light as measured at 1595 nm.

The effective diameter, $D_{eff}$, is defined as:

$$D_{eff}=(2/\pi^{1/2})A_{eff}^{1/2}$$

The profile volume is defined as $2\pi \int \Delta$ % r dr. The profile volume of the central core segment 22 extends from the waveguide centerline, R=0, to the radius $R_1$. The profile volume of the ring segment 26 extends from the radius $R_2$ to the last point of the ring segment at radius $R_4$. The units of the profile volume are % $\mu m^2$ because relative index is dimensionless. The profile volume units, % $\mu m^2$, will be referred to simply as units throughout this document.

The term, $\Delta$ %, represents a relative measure of refractive index defined by the equation, $$\Delta \% = 100(n_i^2 - n_c^2)/2n_c^2$$

where $n_i$ is the maximum refractive index in the respective region i (e.g., 22, 24, 26), unless otherwise specified, and $n_c$ is the refractive index of the cladding (e.g., 30) unless otherwise specified.

The term alpha profile, $\alpha$-profile refers to a refractive index profile, expressed in terms of $\Delta(b)$ %, where b is radius, which follows the equation, $$\Delta(b)\%=[\Delta(b_o)(1-[|b-b_o|/(b_1-b_o)]^\alpha)]100$$

where $b_o$ is the maximum point of the profile and $b_1$ is the point at which $\Delta(b)\%$ is zero and b is in the range $b_i \leq b > b_f$, where $\Delta$ % is defined above, $b_i$ is the initial point of the $\alpha$-profile, $b_f$ is the final point of the $\alpha$-profile, and $\alpha$ is an exponent which is a real number. The initial and final points of the $\alpha$-profile are selected and entered into the computer model. As used herein, if an $\alpha$-profile is preceded by a step index profile, the beginning point of the $\alpha$-profile is the intersection of the $\alpha$-profile and the step profile. In the model, in order to bring about a smooth joining of the $\alpha$-profile with the profile of the adjacent profile segment, the equation is rewritten as;

$$\Delta(b)\%=[\Delta(b_a)+[\Delta(b_o)-\Delta(b_a)]\{(1-[|b-b_o|/(b_1-b_o)]^\alpha)\}]100, \text{ where } b_a \text{ is the first point of the adjacent segment.}$$

The pin array bend test is used to compare relative resistance of optical fibers to bending. To perform this test, attenuation loss is measured when the optical fiber is arranged such that no induced bending loss occurs. This optical fiber is then woven about the pin array and attenuation again measured. The loss induced by bending is the difference between the two attenuation measurements. The pin array is a set of ten cylindrical pins arranged in a single row and held in a fixed vertical position on a flat surface. The pin spacing is 5 mm, center to center. The pin diameter is 0.67 mm. The optical fiber is caused to pass on opposite sides of adjacent pins. During testing, the optical fiber is placed under a tension sufficient to make the waveguide conform to a portion of the periphery of the pins.

SUMMARY OF THE INVENTION

The DC fiber in accordance with the invention disclosed and described herein is particularly well suited to compensating for dispersion and dispersion slope of certain NZDSF in the L-band.

According to an embodiment of the invention, a DC fiber is provided which has a segmented core of at least three segments, each segment characterized by having a refractive index profile, a relative index $\Delta$ %, and radius dimensions. The DC fiber's overall refractive index profile structure is selected to provide a particular set of properties (attributes) that make it suited for transmission systems designed to operate in the L-band wavelength window having a midpoint at about 1595 nm, and a wavelength band between about 1570 nm and 1620 nm. The DC fiber in accordance with the invention is particularly suitable for compensating for build up of dispersion and/or dispersion slope in NZDSF's. Thus, the DC fiber may be coupled to a NZDSF to form a transmission system and is designed to compensate for the dispersion and/or slope (and most preferably both) of the NZDSF, preferably in the L-band. The transmission system including the DC fiber may also preferably include optical amplifiers, Wavelength Division Multiplexing operation, and other conventional system components. Preferably, the DC fiber is wound onto a spool and included in a module.

In accordance with an embodiment of the invention, the total dispersion (defined herein as the measurable dispersion—total dispersion equals total dispersion plus waveguide dispersion plus profile dispersion) of a transmission system employing 100 km of a NZDSF transmission fiber and a suitable length of the present invention DC fiber results in a system which has less than +/−25 ps/nm residual dispersion over the entire L-band (between 1570 nm and 1620 nm). Fiber profiles have been designed in accordance with the invention that exhibit excellent attenuation of less than 0.8 dB/km at 1595 nm. Moreover, the bend loss, as measured by a pin array test, is preferably less than 25 dB, more preferably less than 10 dB, and most preferably less than 3 dB. Thus, the DC fiber in accordance with the invention exhibits excellent bend loss and may be, therefore, advantageously wound onto and used in small diameter DCM's to be utilized in transmission systems for compensating dispersion and dispersion slope of long lengths of NZDSF.

In accordance with a preferred embodiment of the DC fiber, each of the segments of the core is characterized by a refractive index profile, and at least one of the segments preferably has an α-profile. Most preferably, the core profile includes a positive $\Delta_1$ % central core segment, a negative $\Delta_2$ % moat region, and a positive $\Delta_3$ % ring segment. Preferably, the ring segment has a non-step index profile and is offset from the moat segment.

According to the present invention, the DC fiber has a segmented core having at least three segments and the refractive index profile of the segmented core is selected to provide a negative total dispersion and a negative dispersion slope at 1595 nm, and more preferably over the entire L-band from 1570 nm to 1620 nm. The present invention DC fiber has a total dispersion at 1595 nm between about −70 ps/nm-km and −225 ps/nm-km at 1595 nm; and a dispersion slope more negative than −0.7 ps/nm$^2$-km at 1595 nm. More preferably, the dispersion at 1595 nm is between about −95 and −225 ps/nm-km; and the dispersion slope more negative than −0.9 ps/nm$^2$-km at 1595 nm. More preferably yet, the dispersion at 1595 nm is between about −110 and −150 ps/nm-km and ranges between −80 and −190 ps/nm-km over the L-band wavelength range of 1570 nm to 1620 nm.

Most preferably, the dispersion slope is more negative than −0.70 ps/nm$^2$-km at 1595 nm and is preferably between −0.9 ps/nm$^2$-km and −1.5 ps/nm$^2$-km at 1595 nm.

Preferably also, the DC fiber has a dispersion slope that is more negative than −0.5 ps/nm$^2$-km over the entire L-band from 1570 nm to 1620 nm; more preferably more negative than −0.7, and most preferably less than −1.2 ps/nm$^2$-km. Preferably, the dispersion slope ranges between −0.5 and −2.5 ps/nm$^2$-km over the entire L-band; more preferably between −1.0 and −1.8 ps/nm$^2$-km.

The DC optical fiber preferably has a kappa value defined as the total dispersion at 1595 nm divided by the dispersion slope at 1595 nm of between 90 nm and 110 nm; more preferably between 90 nm and 105 nm; and most preferably between 95 nm and 100 nm. Most preferably, kappa is between about between 80 nm and 155 nm over the L-band range of 1570 nm to 1620 nm; more preferably between 85 nm and 110 nm.

The DC fiber preferably includes a central core segment having an a-profile in the range of between about 1.8 to 5.0; more preferably about 2.0 to 2.2.

The DC fiber in accordance with embodiments of the invention preferably has a central core segment having a positive $\Delta_1$ % greater than 1.5%, a moat segment adjoining the central core segment and having a negative $\Delta_2$ % more negative than −0.3%, and a ring segment adjoining the moat segment having a positive $\Delta_3$ % greater than 0.6%.

More preferably, the DC fiber in accordance with embodiments of the invention preferably has a central core segment having a positive $\Delta_1$ % greater than 1.7%, a moat segment adjoining the central core segment and having a negative $\Delta_2$ % more negative than −0.5%, and a ring segment adjoining the moat segment having a positive $\Delta_3$ % greater than 0.8%.

The effective area of the DC fiber at 1595 nm in accordance with the invention is greater than 15 $\mu$m$^2$, and more preferably greater than 17 $\mu$m$^2$.

In accordance with another embodiment of the invention, an optical transmission system is provided having a dispersion compensating optical fiber, wherein the dispersion compensating fiber comprises a segmented core having at least three segments, the refractive index profile being selected to provide a total dispersion at 1595 nm between about −70 ps/nm-km and −225 ps/nm-km; and a dispersion slope more negative than −0.7 ps/nm$^2$-km at 1595 nm.

Further features and advantages of the invention will be set forth in the detailed description which follows, and will be readily apparent to those of ordinary skill in the art from that description or recognized by practicing the invention as described herein, including the detailed description which follows, the claims, as well as the appended drawings. It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate several embodiments of the invention, and together with the description serve to explain the principles and operation of the invention.

DETAILED DESCRIPTION OF THE INVENTION

Figure 1:
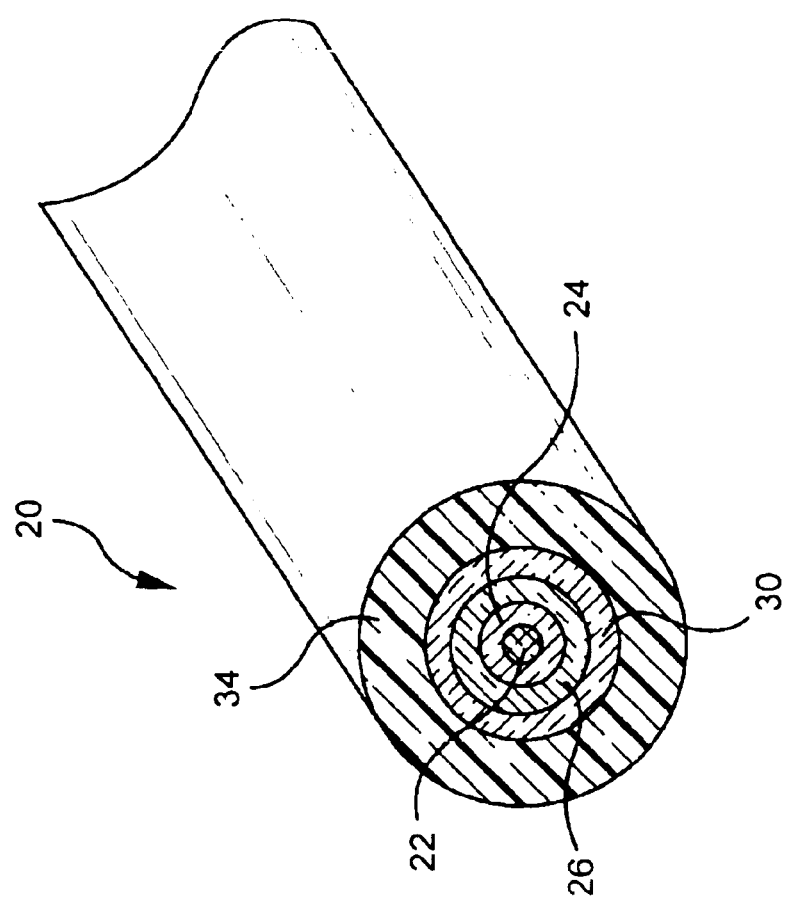
FIG. 1 illustrates a cross-sectioned perspective view of the various segments of the DC fiber in accordance with the invention.

The DC fiber in accordance with the invention may be embodied in a family of segmented core designs that yield a very particular set of desired properties (attributes) and shall be fully described herein. The family of DC fiber core designs include, but are not limited to, the particular embodiments described herein. Thus, it should be recognized that modifications to the particular embodiments described herein may be made without departing from the scope of the invention. A first illustrative embodiment is described with reference to FIGS. 1 and 2. The DC fiber 20 includes at least three segments in the core thereof. It should be understood that FIG. 1, as shown, is not drawn to scale and the relative sizes of the layers have been exaggerated for clarity. Preferably, the DC fiber 20 has a central core segment 22, an adjacent cylindrical moat segment 24, and a cylindrical ring segment 26 surrounding the moat segment. The ring segment 26 is further surrounded by a cylindrical cladding 30 that extends to a radius of about 62.5 μm from the centerline (CL). The entire core and cladding 30 of the fiber 20 is coated with a protective coating 34 such as a urethane acrylate or other suitable coating. The coating 34 may consist of several layers having different properties. For example, the first innermost coating layer may have a lower modulus than a second outermost coating. However, it should be understood that any suitable coating may be applied utilizing conventional methods.

The various core segments 22, 24, 26 preferably include dopants to alter their refractive index relative to the cladding 30. Core segment 20 preferably includes germania-doped silica to increase its refractive index relative to the cladding 30. The cladding 30 is preferably manufactured from pure silica. Moat segment 24 is formed by doping silica glass with a suitable down-dopant such as fluorine. The ring segment 26 is formed similarly to the core segment by utilizing silica with a suitable up-dopant such as germania. Alternative dopants may be employed provided that the levels of index change relative to the cladding may be achieved.

Thus, by the addition of such dopants, a DC fiber core having a precisely defined profile is formed. In particular, by the addition of suitable dopant amounts, the central core segment 22 is made to have a positive $\Delta_1$ %, the moat segment 24 is made to have a negative $\Delta_2$ %, and the ring segment 26 is made to have a positive $\Delta_3$ %. $\Delta_1$ %, $\Delta_2$ % $\Delta_3$ % each is defined as being positive or negative as compared to the refractive index of the cladding 30, as is conventional practice.

As was mentioned above, the DC fiber in accordance with the invention is particularly effective at compensating for dispersion and slope of a NZDSF such as LEAF® manufactured by Corning Incorporated. In particular, the DC fiber is designed to compensate for a NZDSF fiber having a dispersion at 1595 nm of about 7.93 ps/nm-km and a dispersion slope at 1595 nm of 0.0791 ps/nm$^2$-km. In order to compensate for dispersion and slope of a NZDSF and do so in a small fiber length of DC fiber, the DC fiber must have both a high negative dispersion and a high dispersion slope at 1595 nm. Preferably, the ratio of dispersion divided by dispersion slope (defined herein as kappa) should also be within a defined range at 1595 nm. The DC fiber in accordance with the invention is suitable for compensating for any non-zero dispersion shifted fiber having a dispersion slope of between about 0.065 and 0.08 ps/nm$^2$-km at 1595 nm. The DC fiber in accordance with the invention may also be used to compensate for the dispersion of a non-zero dispersion shifted fiber having a dispersion of between about 6.5 and 8.5 ps/nm-km at 1595 nm.

Figure 6:
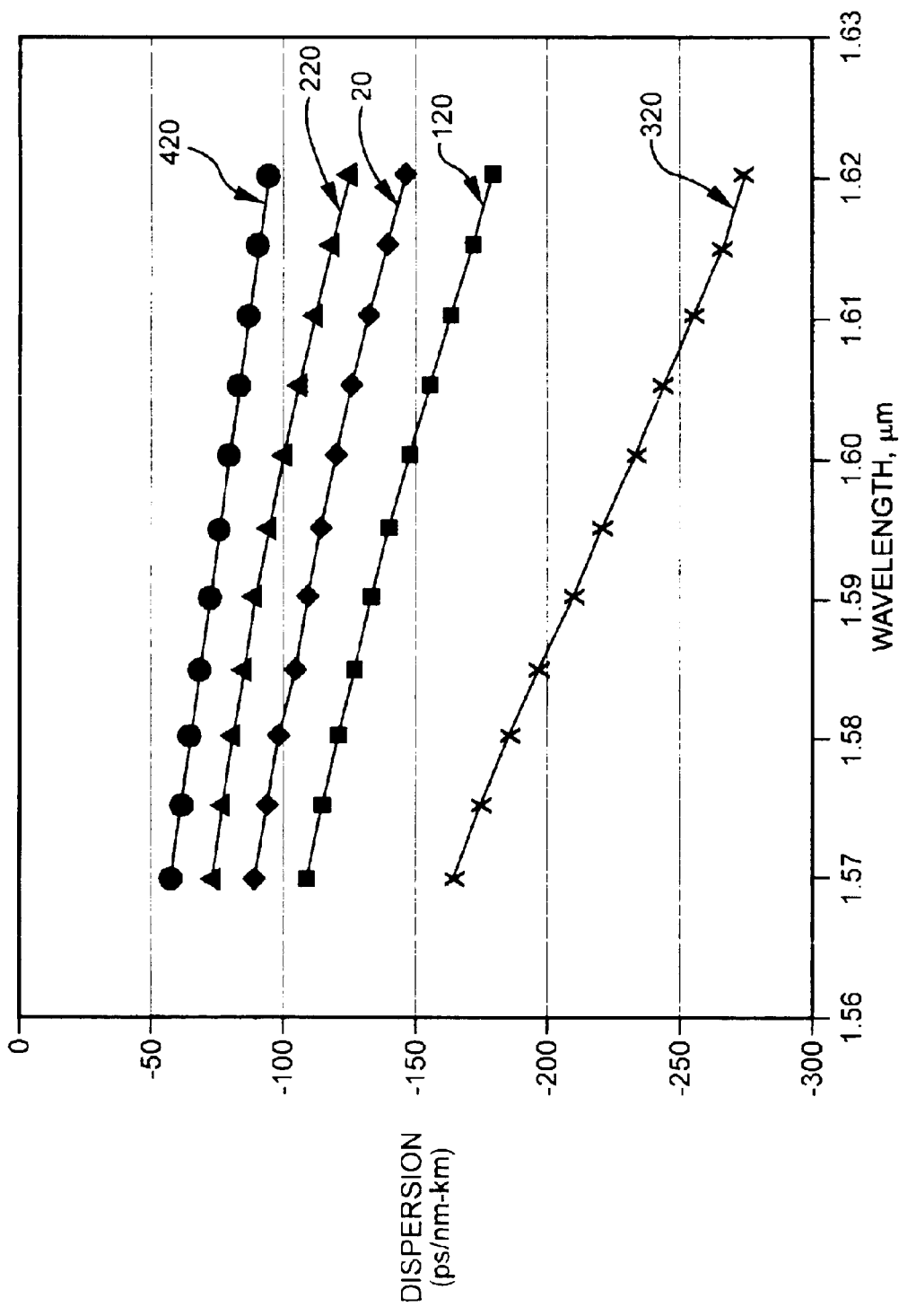
FIG. 6 is a plot of dispersion vs. wavelength for several embodiments of DC fiber in accordance with the invention.
Figure 7:
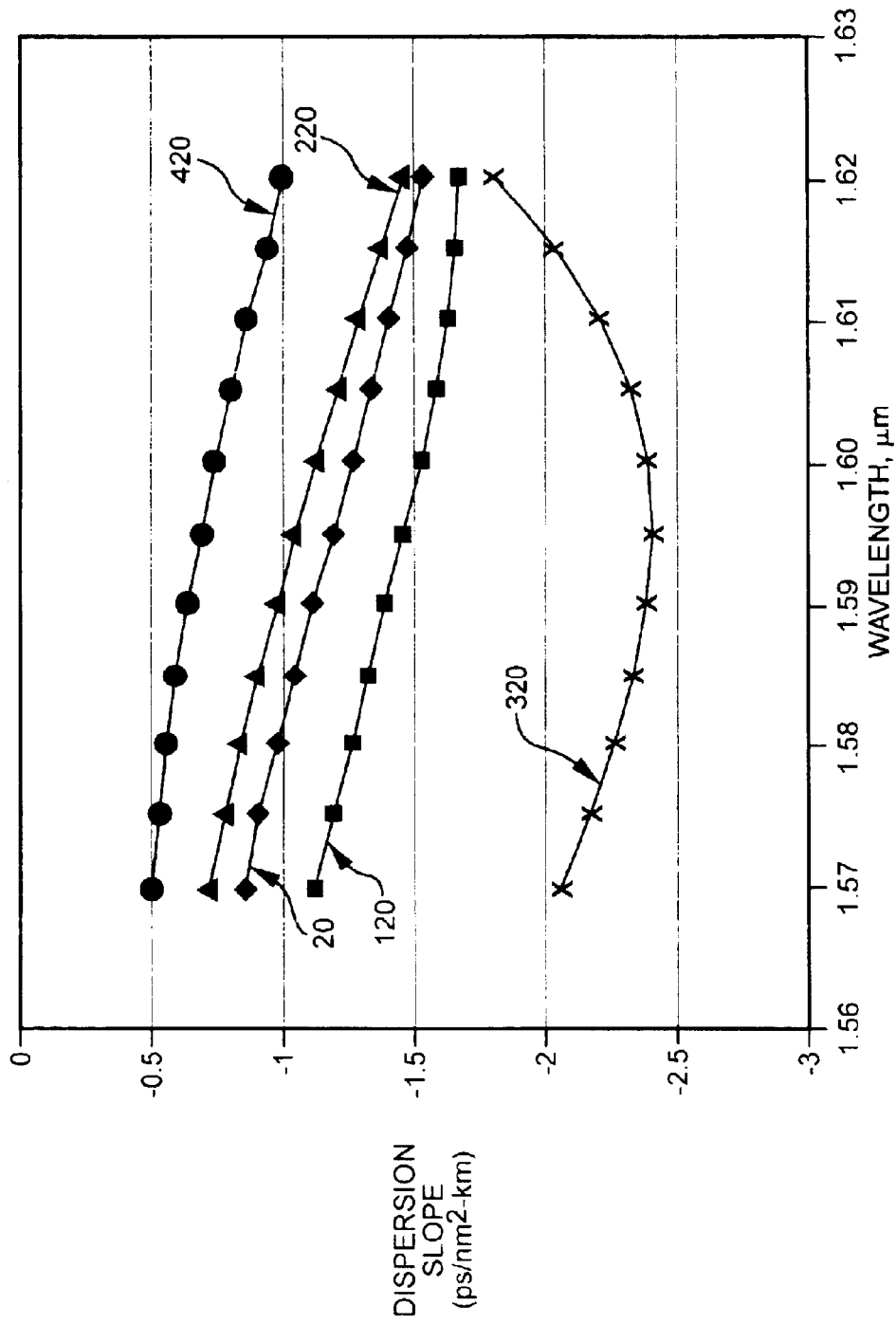
FIG. 7 is a plot of dispersion slope vs. wavelength for several embodiments of DC fiber in accordance with the invention.
Figure 8:
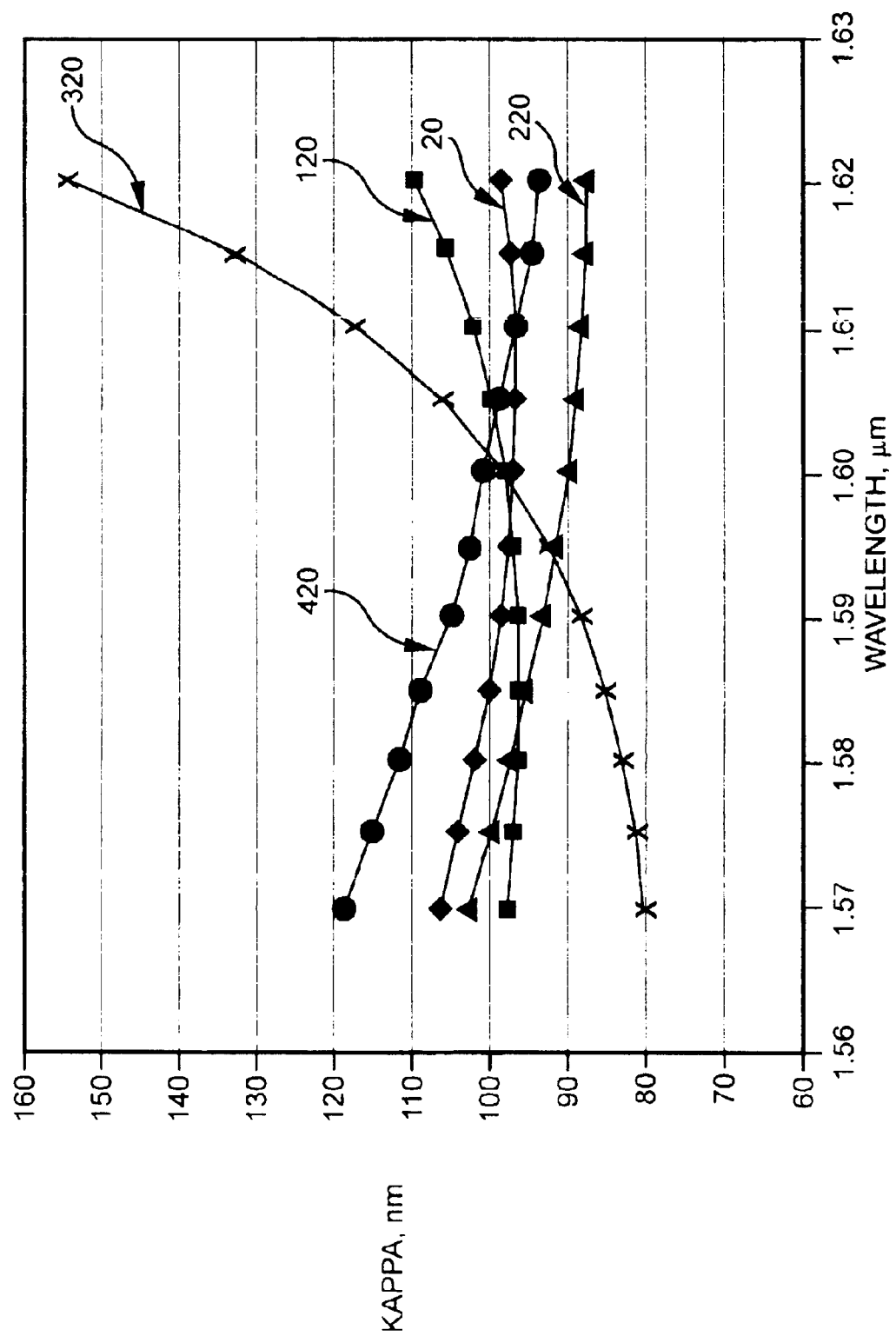
FIG. 8 is a plot of kappa vs. wavelength for several embodiments of DC fiber in accordance with the invention.

In particular, as is illustrated in FIG. 6, the family of DC fibers preferably have a total dispersion ranging between about −60 ps/nm-km and −275 ps/nm-km over the L-band operating window. In one embodiment, total dispersion ranges between −80 and −190 ps/nm-km as is illustrated by curve labeled 120. As is illustrated in FIG. 7, the dispersion slope of the family of DC fibers over the entire L-band (1570 nm to 1620 nm) is more negative than about −0.5 ps/nm$^2$-km; with many being more negative than −0.7 ps/nm$^2$-km; and some being more negative than −1.2 ps/nm$^2$-km. Preferably, the DC fiber has a dispersion slope at 1595 nm of between about −0.7 ps/nm$^2$-km and −2.5 ps/nm$^2$-km. These relatively low negative dispersion values and very low negative slope values enables both dispersion and dispersion slope to be compensated for in the NZDSF in the L-band. As is illustrated in FIG. 8., when compensating for such NZDSF's, it is desired that kappa, defined as the dispersion divided by the dispersion slope, is between about 90 nm and 110 nm at 1595 nm, more preferably between 90 nm and 105 nm; and most preferably between 95 nm and 100 nm. Kappa preferably ranges between about 80 nm and 155 nm over the L-band of 1570 nm to 1620 nm. In some embodiments, kappa has a higher value at 1620 nm than at 1570 nm as is shown in curve labeled 120 in FIG. 8, for example.

Figure 9:
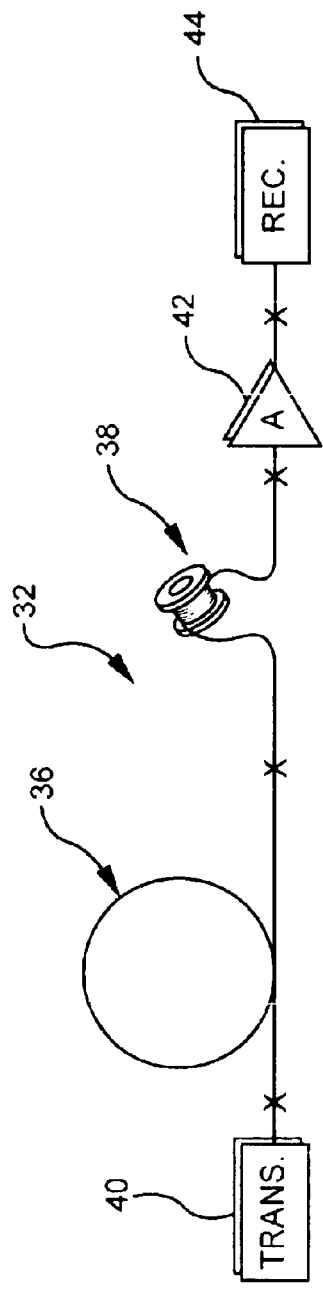
FIG. 9 is a diagram of a first embodiment of transmission system including a DC fiber in accordance with the invention.
Figure 10:
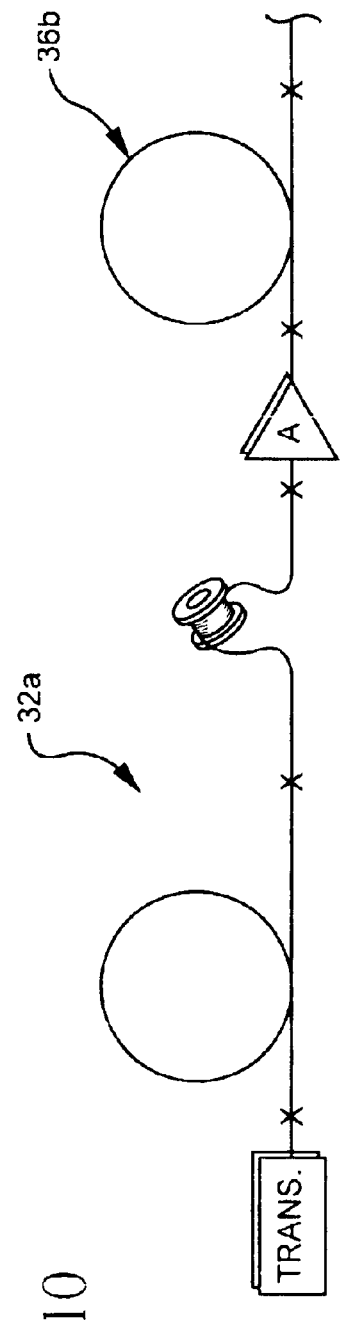
FIG. 10 is a diagram of a second embodiment of transmission system including a DC fiber in accordance with the invention.

By way of example, and not to be considered limiting, a transmission system 32 as shown in FIG. 9 having a 100 km length of NZDSF 36, such as LEAF® fiber manufactured by Corning Incorporated, having a positive dispersion of about 7.93 ps/nm-km at 1595 nm and a positive dispersion slope of about 0.0791 ps/nm²-km at 1595 nm may be compensated for by a shorter length of about 1.8 km of DC fiber 120 in accordance with the invention. In one example, the DC fiber 120 has a dispersion of about −142 ps/nm-km at 1595 nm and a dispersion slope of about −1.46 ps/nm²-km at 1595 nm. Using a DC fiber 20 in the form of a DCM having a dispersion ranging from about −110 ps/nm-km to −180 ps/nm-km over the L-band and a slope of between about −1.15 ps/nm²-km to about −1.7 ps/nm²-km over the L-band, the total residual total dispersion over the entire L-band from 1570 nm to 1620 nm can be made to be no greater than about +/−25 ps/km-nm for the transmission system 32. The transmission system 32 may include conventional elements such as a transceiver 40, optical amplifier 42 and receiver 44. Optionally, as is illustrated in FIG. 10, a transmission system 32a may couple to one or more additional lengths of NZDSF 36b instead of a receiver.

Table 1, set forth below, defines the family of DC fibers according to the invention that have the desired properties for compensating for slope and dispersion of a NZDSF having a dispersion of about 7.9 ps/nm-km and a slope of 0.079 ps/nm²-km at 1595 nm. It should be recognized that in the examples that follow, that attenuation is quite low and bending induced loses are acceptable.

Figure 2:
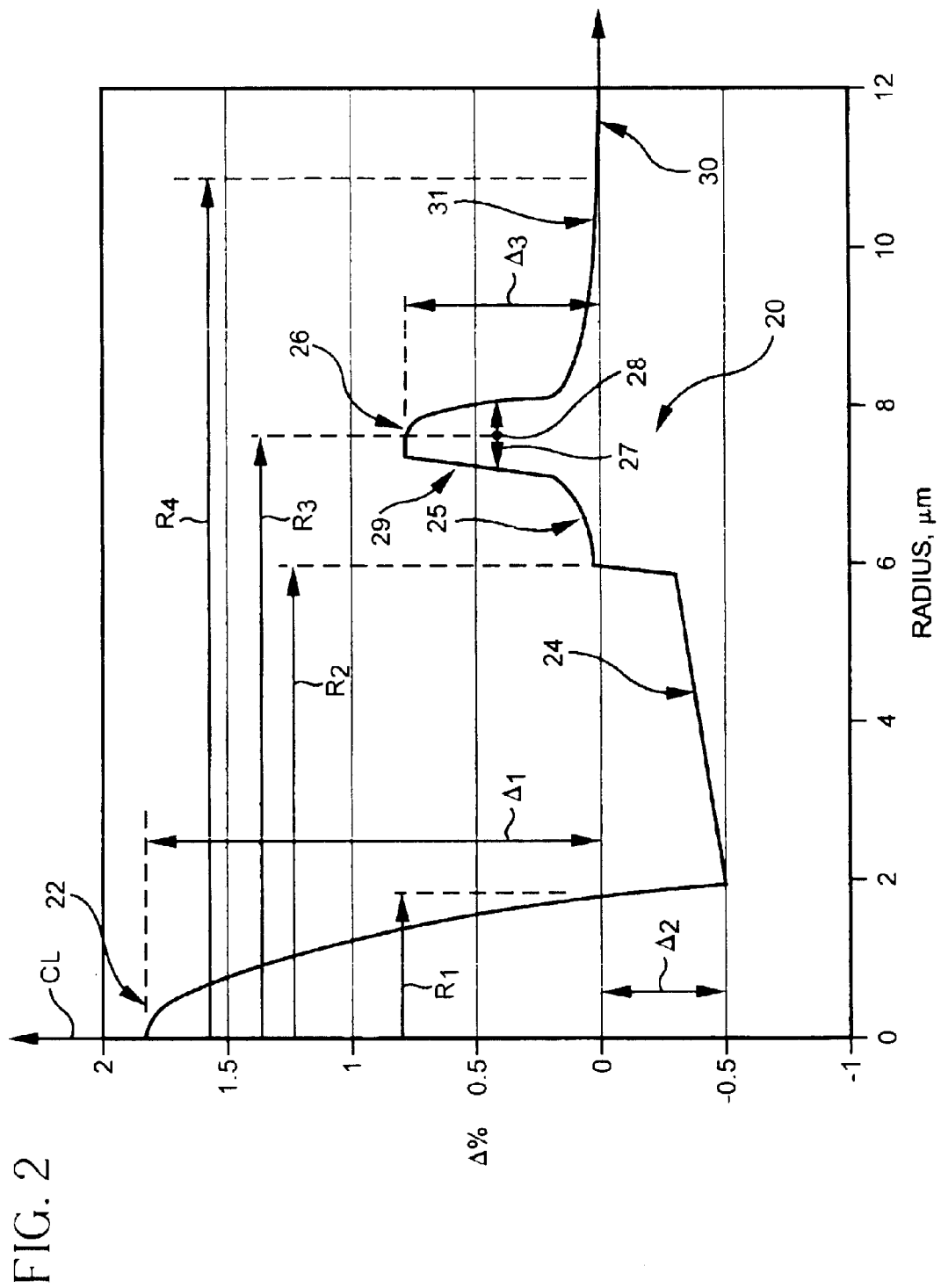
FIG. 2 is a graph of Δ % vs. core radius (μm) of a first embodiment of DC fiber in accordance with the invention.

Referring to FIG. 2, a refractive index profile plot of Δ % vs. core radius (μm) is illustrated. This is a first embodiment of the DC fiber 20 described herein and corresponds to Example 1 in Table 1 below. In particular, central core segment 22 has an alpha profile having an alpha of about 2.0, a maximum $\Delta_1$ % of 1.83% and an outer radius $R_1$ of about 1.83 microns. The core segment includes a step index region having a relative index percent on centerline of about 1.83% and that extends to a radius of about 0.2 μm, at which point the α-profile began. The adjacent moat segment 24 surrounds and abuts the core segment 22 and has a step index profile having a slight taper defined by having a $\Delta_2$ % which is slightly more negative at its innermost radius $R_1$ than at its outer radius $R_2$. The moat segment 24 has an outer radius $R_2$ of about 5.97 μm and a maximum negative $\Delta_2$ % of about −0.5%. The Example 1 embodiment includes a ring segment located at a radius $R_3$. This radius $R_3$ is the mid point radius of the ring segment as defined above. $R_3$ is measured to the midpoint of the half-height width of the ring segment 26. The ring segment 26 surrounds and abuts the moat segment 24 and includes a radius $R_3$ of 7.70 μm, a half height width of the ring segment 26 of about 0.9 μm, and a $\Delta_3$ % of about 0.8%. The ring segment 26 includes a first tapering portion 25 which extends from the body 29 of the ring segment 26 towards the edge of the moat segment 24 at $R_2$. A second tapered portion 31 extends from the body 29 to the beginning of the cladding 30 at $R_4$.

EXAMPLE 1

A DC fiber 20 was modeled in accord with FIG. 2 and had the configuration outlined above. Counting the segments consecutively, beginning with 1 being the central core segment surrounding the centerline, and using the definitions provided above, the core structure is also described in Table 1.

As illustrated in FIGS. 6–8, this embodiment of DC fiber 20 has the following predicted properties:

total dispersion at 1570 nm of −90 ps/nm-km;
total dispersion at 1595 nm of −115 ps/nm-km;
total dispersion at 1620 nm of −148 ps/nm-km;
dispersion slope at 1595 nm of −1.18 ps/nm²-km;
cut off wavelength, $\lambda_c$, of 2019 nm (the cutoff wavelength of the highest of the $LP_{11}$ and $LP_{02}$ higher order modes above $LP_{01}$ for a straight DC fiber);
effective area, $A_{eff}$, of 17.17 μm²;
attenuation at 1595 nm of 0.5 dB/km; and
pin array bend loss of 6.4 dB.

EXAMPLE 2

Figure 3:
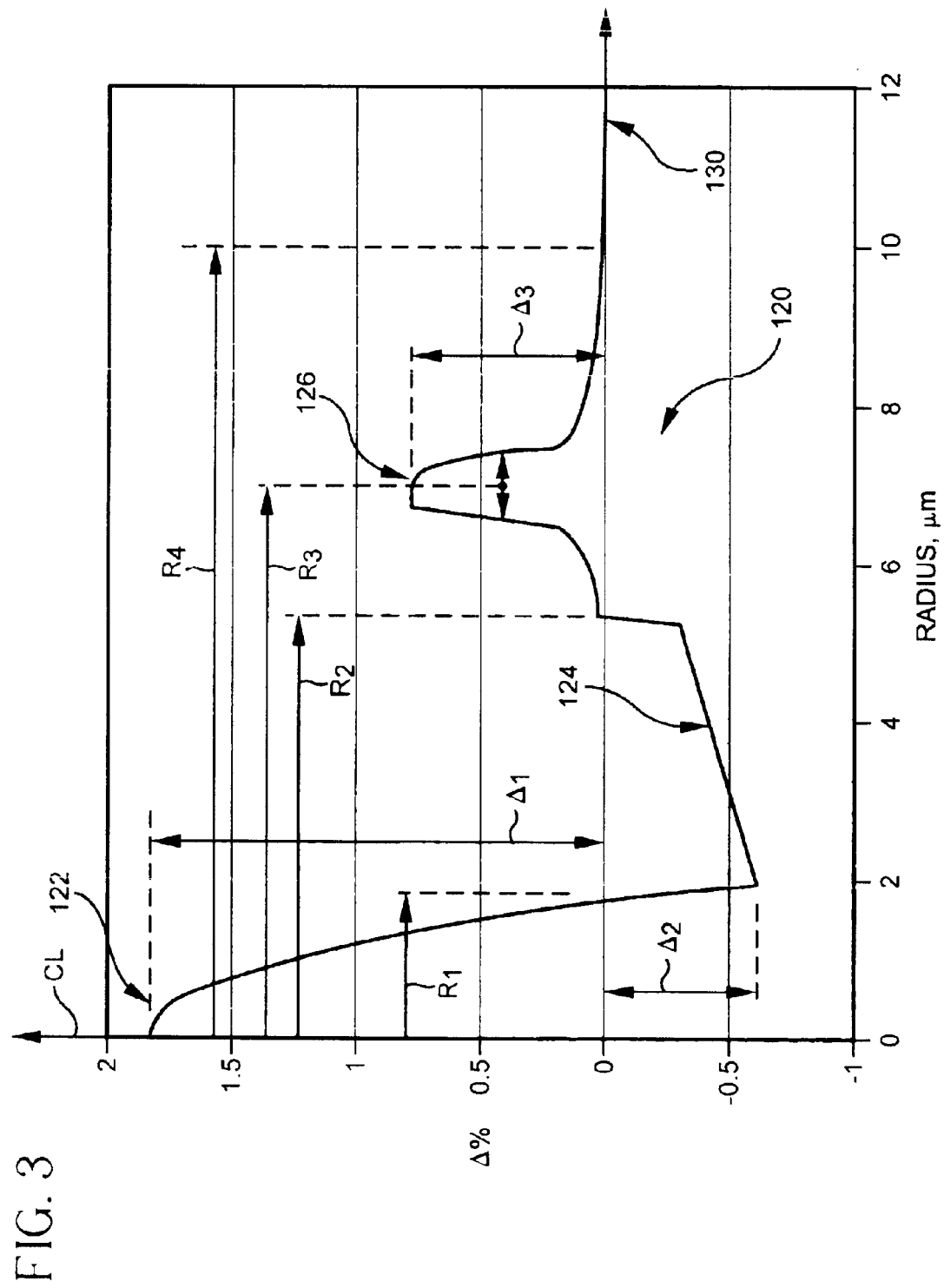
FIG. 3 is a graph of Δ % vs. core radius (μm) of a second embodiment of DC fiber in accordance with the invention.

A second three segment core DC fiber 120 was modeled in accordance with the refractive index profile shown in FIG. 3. In this case, the a-profile of the core segment 122 began at 0.2 μm from the centerline and had an α of 2.0, a $\Delta_1$ % of 1.83%, and an $R_1$ of 1.81 μm. The moat segment 124 had a tapered step profile, a most negative $\Delta_2$ % of −0.6%, and an outer radius $R_2$ of 5.38 μm. The ring segment 126 has a $\Delta_3$ % of 0.85%, $R_3$, the midpoint radius defined above, of 7.02 μm, and a midpoint width of 0.8 μm. Additional properties and characterizations may be found in Table 1.

As illustrated in FIGS. 6–8, this DC fiber 120 has the following predicted properties:

total dispersion at 1570 nm of −118 ps/nm-km;
total dispersion at 1595 nm of −142 ps/nm-km;
total dispersion at 1620 nm of −180 ps/nm-km;
dispersion slope at 1595 nm of −1.46 ps/nm²-km;
cut off wavelength, $\lambda_c$, of 1975 nm (the cutoff wavelength of the highest of the $LP_{11}$ and $LP_{02}$ higher order modes above $LP_{01}$ for a straight DC fiber);
effective area, $A_{eff}$, of 17.49 μm²;
attenuation at 1595 nm of 0.6 dB/km; and
pin array bend loss of 6.8 dB.

In this embodiment, the properties are excellent and the bend loss is improved over the design of Example 1.

EXAMPLE 3

Figure 4:
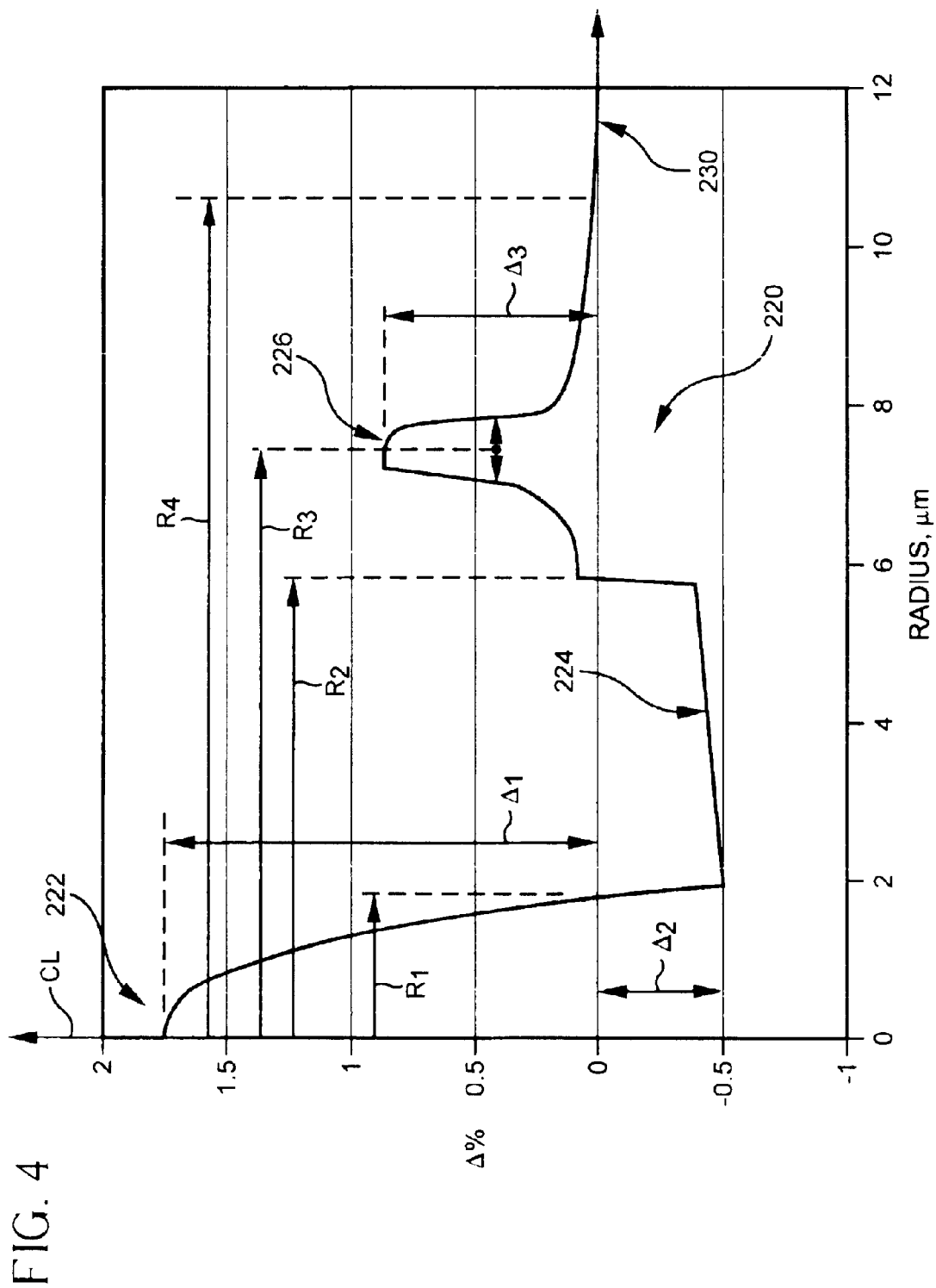
FIG. 4 is a graph of Δ % vs. core radius (μm) of a third embodiment of DC fiber in accordance with the invention.

A DC fiber 220 in accordance with the invention having a profile illustrated in FIG. 4 was also modeled. The core segment 222 had a relative index $\Delta_1$ of 1.73% and an outer radius $R_1$ of 1.83 μm. The α-profile had an α of 2.2. The moat segment 224 has a $\Delta_2$ % of −0.5%, and outer segment radius $R_2$ of 5.87 μm. The ring segment 226 had a $\Delta_3$ % of 0.85 and a midpoint radius $R_3$ of 7.53 μm. This DC fiber 220 had the following predicted properties:

total dispersion at 1570 nm of −75 ps/nm-km;
total dispersion at 1595 nm of −95 ps/nm-km;
total dispersion at 1595 nm of −126 ps/nm-km;
dispersion slope −1.04 ps/nm²-km;
cut off wavelength, $\lambda_c$, 2010 nm (the cutoff wavelength of the highest of the $LP_{11}$ and $LP_{02}$ higher order modes above $LP_{01}$ for a straight DC fiber);
effective area, $A_{eff}$, 16.73 μm²;
attenuation at 1595 nm of 0.5 dB/km; and
pin array bend loss of 5.5 dB.

EXAMPLE 4

Figure 5:
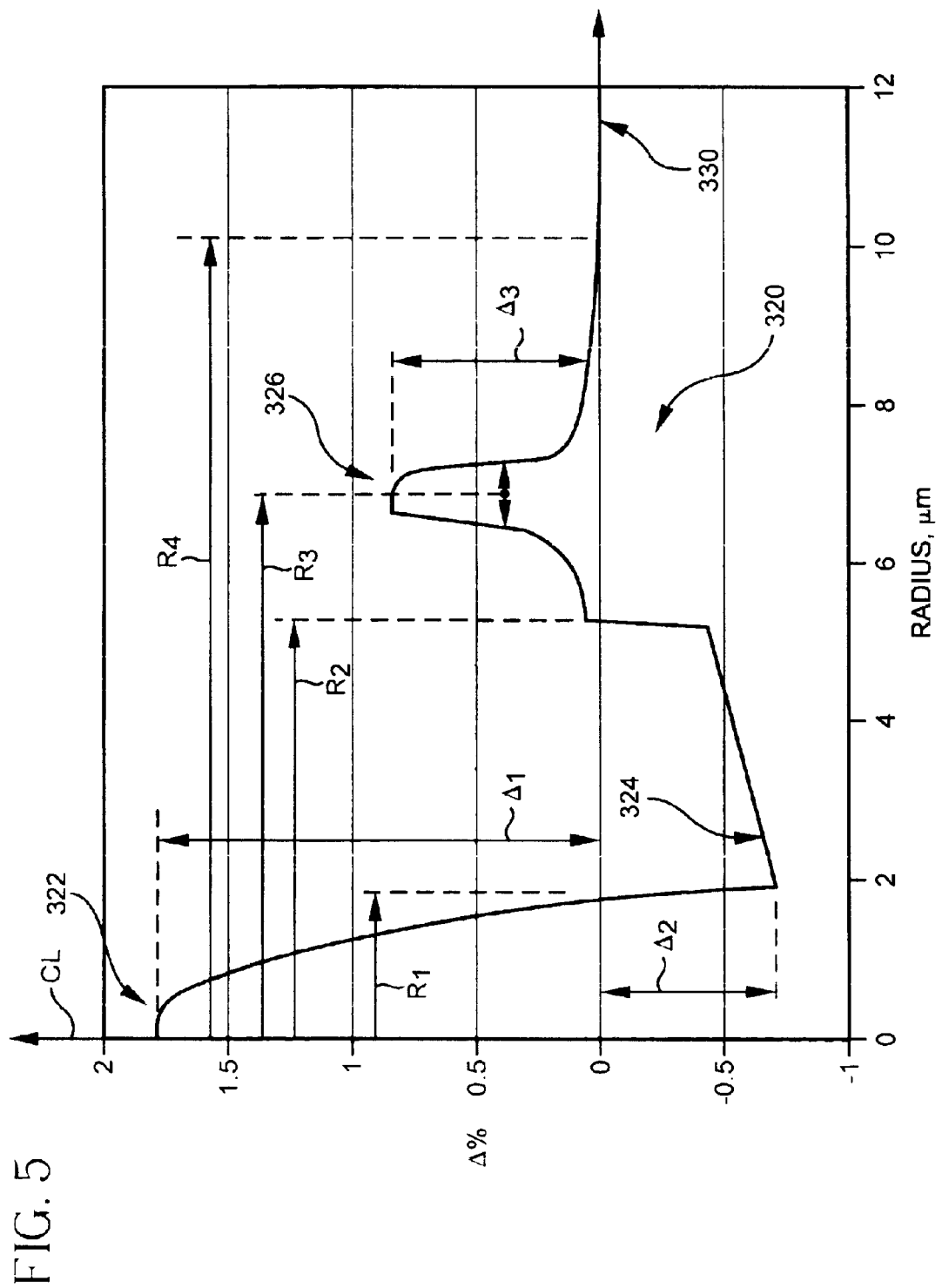
FIG. 5 is a graph of Δ % vs. core radius (μm) of a fourth embodiment of DC fiber in accordance with the invention.

As a further example of a three-segment design, DC fiber 320 in accordance with the invention was also modeled. Referring to FIG. 5, the core segment 322 has an α-profile with α of 2.0, a $\Delta_1$ % of 1.83%, and an $R_1$ of 1.79 μm. Moat segment 324 has a $\Delta_2$ % of −0.7%, an outer radius $R_2$ of 5.33 μm. Ring segment 326 has a $\Delta_3$ % of 0.85, midpoint radius $r_3$ is 6.93 μm and the half height width of ring segment is 0.8 μm.

This DC fiber in accordance with the invention has the following predicted properties:

total dispersion at 1570 nm of −165 ps/nm-km;
total dispersion at 1595 nm of −222 ps/nm-km;
total dispersion at 1620 nm of −275 ps/nm-km;
dispersion slope at 1595 nm of −2.40 ps/nm²-km;
cut off wavelength, $\lambda_c$, of 1950 nm (the cutoff wavelength of the highest of the $LP_{11}$ and $LP_{02}$ higher order modes above $LP_{01}$ for a straight DC fiber);
effective area, $A_{\mathit{eff}}$, of 19.84 μm²;
attenuation at 1595 nm of 0.8 dB/km; and
pin array bend loss of 22 dB.

EXAMPLE 5

Figure 11:
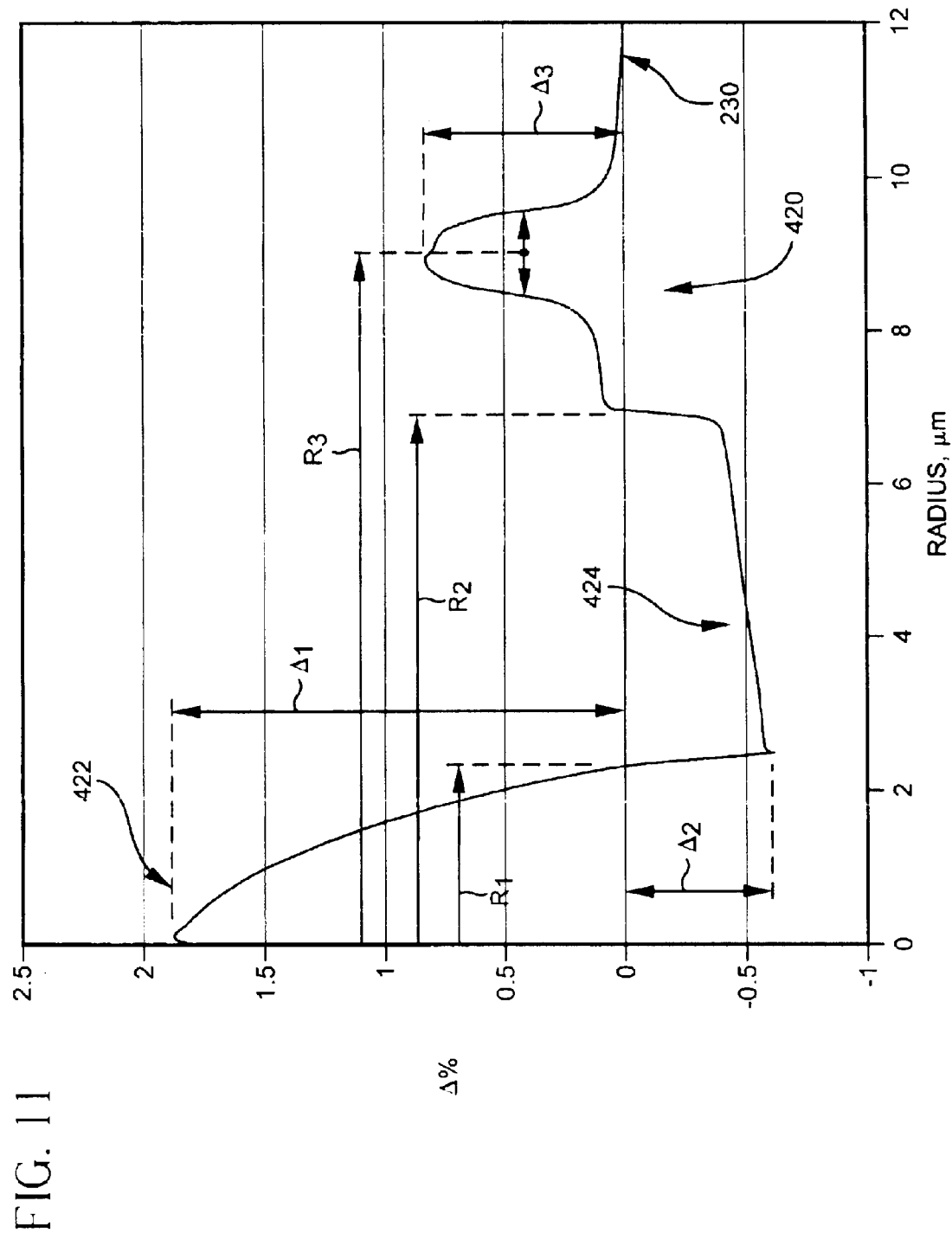
FIG. 11 is a graph of Δ % vs. core radius (μm) of a fifth embodiment of DC fiber in accordance with the invention.

As a further example of a three-segment design, DC fiber 420 in accordance with the invention was also modeled. Referring to FIG. 11, the core segment 422 has an a-profile with a of 2.0, a $\Delta_1$ % of 1.89%, and an $R_1$ of 1.86 μm. Moat segment 424 has a $\Delta_2$ % of −0.61%, an outer radius $R_2$ of 5.68 μm. Ring segment 426 has a $\Delta_3$ % of 0.81, midpoint radius $r_3$ is 7.41 μm and the half height width of ring segment is 0.9 μm.

This DC fiber in accordance with the invention has the following predicted properties:

total dispersion at 1570 nm of −58 ps/nm-km;
total dispersion at 1595 nm of −74 ps/nm-km;
total dispersion at 1620 nm of −95 ps/nm-km;
dispersion slope at 1595 nm of −0.71 ps/nm²-km;
cut off wavelength, $\lambda_c$, of 2037 nm (the cutoff wavelength of the highest of the $LP_{11}$ and $LP_{02}$ higher order modes above $LP_{01}$ for a straight DC fiber);
effective area, $A_{\mathit{eff}}$, of 15.63 μm²;
attenuation at 1595 nm of 0.7 dB/km; and
pin array bend loss of 3.0 dB.

Table 1 below illustrates preferred DC fiber parameters in accordance with the invention that result in achievement of the desired properties. Parameters are illustrated in Table 1 for the four segment designs listed above (having a three segment core and a fourth segment designated as cladding). Set forth are maximum Δ % of each particular segment, as well as corresponding radii $R_1$. The cases in which the radius measurements are taken to the midpoint of a segment are labeled in the table heading. All other radii are the maximum out radii of a given segment as well as the minimum inner radii of the next adjacent segment, where the segments are counted beginning with 1 (corresponding to the central core segment) and proceeding outward. These other radii are measured to the point where the profile crosses the cladding refractive index.

TABLE 1

| | Example | | | | |
|---|---|---|---|---|---|
| | 1 | 2 | 3 | 4 | 5 |
| $\Delta_1$% | 1.83 | 1.83 | 1.73 | 1.83 | 1.89 |
| $R_1$ (μm) | 1.82 | 1.81 | 1.82 | 1.79 | 1.86 |

TABLE 1-continued

| | Example | | | | |
|---|---|---|---|---|---|
| | 1 | 2 | 3 | 4 | 5 |
| $\Delta_2$% | −0.5 | −0.6 | −0.5 | −0.7 | −0.6 |
| $R_2$ (μm) | 5.97 | 5.38 | 5.87 | 5.33 | 5.68 |
| $\Delta_3$% | 0.8 | 0.85 | 0.85 | 0.85 | 0.81 |
| $R_3$ (μm) | 7.70 | 7.02 | 7.53 | 6.97 | 7.41 |
| $R_4$ (μm) | 11.0 | 10.2 | 10.8 | 10.0 | 10.7 |
| Alpha Central Core (units) | 2.0 | 2.0 | 2.2 | 2.0 | 2.0 |
| Volume Central Core (units) | 10.2 | 10.0 | 10.1 | 9.8 | 10.6 |
| Volume Ring | 45.8 | 42.6 | 45.0 | 41.9 | 45.5 |
| Dispersion @ 1595 nm (ps/nm-km) | −115 | −142 | −95 | −222 | −74 |
| Dispersion Slope @ 1595 nm (ps/nm²-km) | −1.18 | 1.46 | −1.04 | −2.40 | −0.71 |
| Kappa @ 1595 nm (nm) | 97.9 | 97.2 | 91.3 | 92.5 | 103 |
| Mode Field Diameter (μm²) | 4.67 | 4.64 | 4.63 | 4.74 | 4.52 |
| Aeff (μm) | 17.17 | 17.49 | 16.73 | 19.84 | 15.63 |
| $\lambda_c$ (nm) | 2019 | 1975 | 2010 | 1950 | 2037 |

The present invention DC fiber may be manufactured in accordance with any known chemical vapor deposition method such as OVD, MCVD, or PCVD. Preferably, the DC fiber may be manufactured by an OVD method wherein the core is first manufactured by depositing silicon oxide doped with germania oxide onto an alumina mandrel to the desired diameter and with the appropriate level of germania dopant to achieve the desired refractive index profile for the core segment. The mandrel is then removed and the soot preform constituting the core segment is consolidated in a consolidating furnace including a helium atmosphere after thoroughly drying in a chlorine containing environment. The consolidated core blank is then redrawn into a core cane which then becomes the target deposition surface for the application of the moat segment soot. The silica soot is deposited to the appropriate diameter for the moat and is then dried with a chlorine-containing atmosphere in a consolidation furnace. The soot preform is then doped with fluorine-containing gas, such as $CF_4$ or $SiF_4$ for example and subsequently consolidated and again redrawn into canes. These canes become the deposition surface for the ring segment soot. Germania-doped silica soot is deposited on the two-segment cane and it is then dried and consolidated. Again, the consolidated blank is redrawn and this time becomes the final core cane including all three segments of the segmented core. Additional silica soot which comprises the cladding is then deposited on the core cane. The final soot blank is dried and consolidated and subsequently transferred to a draw furnace where the DC fiber is drawn therefrom. Although particular examples of the DC fiber have been disclosed and described herein, it will be apparent to those of ordinary skill in the art that various modifications and variations can be made to the present invention without departing from the scope of the invention. Thus, it is intended that the present invention covers such modifications and variations of this invention provided they come within the scope of the appended claims and their equivalents.

What is claimed is:

1. A dispersion compensating optical fiber, comprising:
    a segmented core having at least three segments including a central core segment, a moat segment, and a ring segment wherein the central core segment has an outer radius $R_1$ in the range between 1.5 to 2.0 μm, the refractive index profile being selected to provide
total dispersion at 1595 nm between −70 ps/nm-km and −225 ps/nm-km;
a dispersion slope more negative than −0.7 ps/nm²-km at 1595 nm; and
a range of kappa values, defined as the dispersion at a particular wavelength divided by the dispersion slope at the particular wavelength, of between 80 nm to 155 nm for all wavelengths in a wavelength range between 1570 nm and 1620 nm, and kappa value at 1595 nm between 90 nm and 110 nm.

2. The dispersion compensating optical fiber of claim 1 wherein
the total dispersion at 1595 nm is between about −95 ps/nm-km and −150 ps/nm-km; and
the dispersion slope is more negative than −1.0 ps/nm²-km at 1595 nm.

3. The dispersion compensating optical fiber of claim 1 wherein the total dispersion at 1595 nm is between about −110 ps/nm-km and −150 ps/nm-km.

4. The dispersion compensating optical fiber of claim 1 wherein the total dispersion is between about −60 ps/nm-km and −190 ps/nm-km over a wavelength range from about 1570 nm to 1620 nm.

5. The dispersion compensating optical fiber of claim 1 wherein at least one of the segments has a shape of an α-profile where a is an exponent between about 2.0 and 2.2.

6. The dispersion compensating optical fiber claim 1 wherein a relative refractive index of the central core segment $\Delta_1$ % is positive, a relative refractive index of the in at segment $\Delta_2$ % is negative, and a relative refractive index of the ring segment $\Delta_3$ % is positive.

7. The dispersion compensating optical fiber of claim 6 wherein the central core segment has a positive relative refractive index $\Delta_1$ % greater than 1.5%, the moat segment adjoining the central core segment has a negative relative refractive index $\Delta_2$ % more negative than −0.4%, and the ring segment adjoining the moat segment has a positive relative refractive index $\Delta_3$ % greater than 0.7%.

8. The dispersion compensating optical fiber of claim 6 wherein a volume of the central core segment is in the range of about 9 profile volume units (% μm²) and 11 profile volume units (% μm²), and a volume of the ring segment is in the range of about 40 profile volume units (% μm²) to 47 profile volume units (% μm²).

9. The dispersion compensating optical fiber of claim 1 further comprising:
the central core segment having a relative refractive index $\Delta_1$ % in the range of about 1.5% to 2.0%,
the moat segment having a relative refractive index $\Delta_2$ % in the range of about −0.3% to −0.9% and a outer radius $R_2$ in the range of about 4.5 μm to 6.5 μm, and
the ring segment having a relative refractive index $\Delta_3$ % in the range of about 0.6% to 1.1%, a mid point radius $R_3$ in the range of about 6.0 μm to 8.0 μm.

10. The dispersion compensating optical fiber of claim 1 further comprising:
the central core segment having a positive relative refractive index $\Delta_1$ % greater than 1.7%,
the moat segment adjoining the central core segment having a negative relative refractive index $\Delta_2$ % more negative than −0.5%, and
the ring segment adjoining the moat segment having a positive relative refractive index $\Delta_3$ % greater than 0.8%.

11. The dispersion compensating optical fiber of claim 1 further comprising a volume of the ring segment is greater than about 40 profile volume units (% μm²).

12. The dispersion compensating optical fiber of claim 1 further comprising the ring segment having a relative refractive index $\Delta_3$ % of greater than 0.7%.

13. The dispersion compensating optical fiber of claim 12 further comprising a relative refractive index $\Delta_3$ % of the ring segment between 0.7% and 1.0% and a midpoint radius R3 between 6.5 μm and 8.0 μm.

14. The dispersion compensating optical fiber of claim 1 further comprising:
the central core segment having a relative refractive index $\Delta_1$ % in the range of about 1.7% to 1.9% and an outer radius $R_1$ in the range of between about 1.7 μm to 1.9 μm,
the moat segment having a relative refractive index $\Delta_2$ % in the range of about −0.5% to −0.7% and an outer radius $R_2$ of between 5.0 μm and 6.0 μm, and
the ring segment having a relative refractive index $\Delta_3$ % in the range of about 0.75% to 0.9%, a midpoint radius $R_3$ in the range of about 6.5 μm to 8.0 μm.

15. The dispersion compensating optical fiber of claim 1 further including a kappa value defined the dispersion at 1595 nm divided by the dispersion slope at 1595 nm of between 90 nm and 105 nm.

16. The dispersion compensating optical fiber of claim 1 further including a kappa value defined as the dispersion at 1595 nm divided by the dispersion slope at 1595 nm of between 95 nm and 100 nm.

17. The dispersion compensating optical fiber of claim 1 further comprising a range of kappa values defined as the dispersion at a particular wavelength divided by the dispersion slope at the particular wavelength over the range of 1570 nm to 1620 nm of between 85 nm to 110 nm.

18. The dispersion compensating optical fiber of claim 1 further comprising a pin array of less than 7 dB at 1595 nm when woven about ten 0.67 mm diameter pins, arranged in a row and spaced at a 5 mm center-to-center distance.

19. The dispersion compensating optical fiber of claim 1 further comprising a cutoff wavelength for a next higher order mode above $LP_{01}$, the cutoff wavelength being less than 2050 nm.

20. The dispersion compensating optical fiber of claim 1 further comprising an effective area a 1595 nm of greater than 15 μm².

21. The dispersion compensating optical fiber of claim 20 further comprising an effective area a 1595 nm of greater than 17 μm².

22. The dispersion compensating optical fiber of claim 1 further comprising an dispersion slop over the wavelength range of between about 1570 nm and 1620 nm of between −0.5 ps/nm²-km and −2.5 ps/nm²-km.

23. The dispersion compensating optical fiber of claim 22 further comprising an dispersion slope over the wavelength range of between about 1570 nm and 1620 nm of between −1.0 ps/nm²-km and −1.8 ps/nm²-km.

24. The dispersion compensating optical fiber of claim 1 further comprising an dispersion slope at 1595 nm of between −0.7 ps/nm²-km and −2.5 ps/nm²-km.

25. The dispersion compensating optical fiber of claim 1 further comprising an dispersion slope at 1595 nm of between −0.9 ps/nm²-km and −1.5 ps/nm²-km.

26. The dispersion compensating optical fiber of claim 1 further comprising an dispersion slope at 1595 nm more negative than −0.9 ps/nm²-km.

27. The dispersion compensating optical fiber of claim 1 further comprising an dispersion slope at 1595 nm more negative than −1.2 ps/nm²-km.

28. The dispersion compensating optical fiber of claim 1 further comprising dispersion slope that is more negative than −0.5 ps/nm²-km over the entire L-band from 1570 nm to 1620 nm.

29. The dispersion compensating optical fiber of claim 28 further comprising a dispersion slope that is more negative than −1.2 ps/nm²-km over the entire L-band from 1570 nm to 1620 nm.

30. The dispersion compensating optical fiber of claim 1 further comprising:

the moat segment having an outer radius $R^2$ in the range of between about 4.5 µm and 6.5 µm, and the ring segment having a midpoint radius $R_3$ in the range of between about 6.0 µm to 8.0 µm.

31. The dispersion compensating optical fiber of claim 30 further comprising an outer radius $R_4$ of the ring segment in the range of between about 10 µm and 12 µm.

32. A dispersion compensating optical fiber of claim 1, further comprising a ratio of the outer radius R1 of the central core segment divided by an outer radius of the moat segment of between 0.30 and 0.34.

33. An optical transmission system having a dispersion compensating optical fiber, wherein the dispersion compensating fiber comprises:

a segmented core having at least three segments including a central core segment, a moat segment, and a ring segment wherein the central core segment has an outer radius $R_1$ in the range between 1.5 µm to 2.0 µm, the refractive index profile being selected to provide total diversion at 1595 nm between −70 ps/nm-km and −225 ps/nm-km;

a dispersion slope more negative than −0.7 ps/nm²-km at 1595 nm; and a range of kappa values, defined as the dispersion at a particular wavelength divided by the dispersion slope at the particular wavelength, of between 80 nm to 155 nm for all wavelengths in a wavelength range between 1570 nm and 1620 nm, and kappa value at 1595 nm between 90 nm and 110 nm.

34. The optical transmission system of claim 33 further comprising a total dispersion at 1595 nm between about −95 ps/nm-km and −150 ps/nm-km; and dispersion slope more negative than −1.0 ps/nm²-km at 1595 nm.

35. The optical transmission system of claim 33 further comprising a non-zero dispersion shifted fiber coupled to the dispersion compensating fiber, the non-zero dispersion shifted fiber having a dispersion slope of between about 0.065 and 0.08 ps/nm²-km at 1595 nm.

36. The optical transmission system of claim 35 wherein the non-zero dispersion shifted fiber ha a dispersion of between about 6.5 and 8.5 ps/nm-km at 1595 nm.

37. A dispersion compensating optical fiber, comprising:

a segmented core having at least three segments including a central core segment, a moat segment, and a ring segment wherein the central core segment has a relative refractive index $\Delta_1$ % in the range of 1.5% to 2.0% and an outer radius $R_1$ in the range between 1.5 µm to 2.0 µm, a refractive index profile of the segmented core being selected to provide a total dispersion at 1595 nm between about −110 ps/nm-km and −150 ps/nm-km;

a dispersion slope at 1595 nm of between −0.9 ps/nm²-km and −1.5 ps/nm²-km; and a range of kappa values, defined as the dispersion at a particular wavelength divided by the dispersion slope at the particular wavelength, of between 80 nm to 155 nm for all wavelengths in a wavelength range between 1570 nm and 1620 nm, and a kappa value at 1595 nm between 90 nm and 110 nm.

38. An optical transmission system, comprising:

a dispersion compensating optical fiber having a segmented core and a refractive index profile with at least three segments including a central core segment, a moat segment, and a ring segment wherein the central core segment has an outer radius $R_1$ in the range between 1.5 µm to 2.0 µm, the refractive index profile being selected to provide a total dispersion at 1595 nm between about −110 ps/nm-km and −150 ps/nm-km, a dispersion slope at 1595 nm of between −0.9 ps/nm²-km and −1.5 ps/nm²-km, and a range of kappa values, defined as the dispersion at a particular wavelength divided by the dispersion slope at the particular wavelength, of between 80 nm to 155 nm for all wavelengths in a wavelength range between 1570 nm and 1620 nm, and a kappa value at 1595 nm between 90 nm and 110 nm, and a non-zero dispersion shifted fiber coupled to the dispersion compensating optical fiber, the non-zero dispersion shifted fiber having a dispersion slope of between about 0.065 and 0.08 ps/nm²-km at 1595 nm.

39. An optical transmission system, comprising:

a dispersion compensating optical fiber having a refractive index profile with a segmented core and at least three segments including a central core segment, a moat segment, and a ring segment wherein the central core segment has an outer radius $R_1$ in the range between 1.5 µm to 2.0 µm, the refractive index profile being selected to provide a total dispersion at 1595 nm between −0.7 ps/nm-km and −225 ps/nm-km;

a dispersion slope more negative than −0.7 ps/nm²-km at 1595 nm; and a range of kappa values, defined as the dispersion at a particular wavelength divided by the dispersion slope at the particular wavelength, of between 80 nm to 155 nm for all wavelengths in a wavelength range between 1570 nm and 1620 nm, and a kappa value at 1595 nm between 90 nm and 110 nm, and a non-zero dispersion shifted fiber coupled to the dispersion compensating optical fiber, the non-zero dispersion shifted fiber having a dispersion slope of between about 0.065 and 0.08 ps/nm²-km at 1595 nm wherein a residual dispersion of the transmission system over the wavelength range from 1570 nm to 1620 nm is no greater than +/−25 ps/km-nm per a 100 km length of the non-zero dispersion shifted fiber.

* * * * *

UNITED STATES PATENT AND TRADEMARK OFFICE
CERTIFICATE OF CORRECTION

PATENT NO. : 6,807,351 B2
DATED : October 19, 2004
INVENTOR(S) : Hebgen Peter G. et al.

It is certified that error appears in the above-identified patent and that said Letters Patent is hereby corrected as shown below:

Column 11,
Line 29, "a-profile where a is an exponent between about 2.0 and 2.2" should be
-- $\alpha$-profile where $\alpha$ is an exponent between about 2.0 and 2.2 --
Line 32, "ment $\Delta_1\%$ is positive, a relative refractive index of the in at" should be
-- ment $\Delta_1\%$ is positive, a relative refractive index of the moat --

Column 12,
Line 24, "further including a kappa value defined the dispersion at" should be
-- further including a kappa value defined as the dispersion at --
Lines 45 and 48, "further comprising an effective area a 1595 nm of greater" should be
-- further comprising an effective area at 1595 nm of greater --
Line 51, "further comprising an dispersion slop over the wavelength" should be
-- further comprising an dispersion slope over the wavelength --

Column 13,
Line 30, "total diversion at 1595 nm between -70 ps//nm-km and" should be
-- total dispersion at 1595 nm between -70 ps/nm-km and --
Line 50, "the non-zero dispersion shifted fiber ha a dispersion of" should be
-- the non-zero dispersion shifted fiber has a dispersion of --

Signed and Sealed this

Eighth Day of February, 2005

JON W. DUDAS
*Director of the United States Patent and Trademark Office*